(12) United States Patent
Axakov et al.

(10) Patent No.: US 8,998,311 B2
(45) Date of Patent: Apr. 7, 2015

(54) SEAT FRAME FOR A VEHICLE SEAT

(71) Applicant: I. G. Bauerhin GmbH, Gruendau (DE)

(72) Inventors: Dmitri Axakov, Windsor (CA); Markus Weber, Gelnhausen (DE); Steffen Alter, Bad Soden (DE)

(73) Assignee: I. G. Bauerhin GmbH, Gruendau (DE)

( * ) Notice: Subject to any disclaimer, the term of this patent is extended or adjusted under 35 U.S.C. 154(b) by 35 days.

(21) Appl. No.: 13/644,007

(22) Filed: Oct. 3, 2012

(65) Prior Publication Data

US 2013/0088064 A1    Apr. 11, 2013

(30) Foreign Application Priority Data

Oct. 6, 2011  (DE) .................... 20 2011 106 357 U
Nov. 14, 2011  (DE) .................... 20 2011 107 805 U

(51) Int. Cl.
*A47C 7/72* (2006.01)
*B60N 2/56* (2006.01)
*B60N 2/68* (2006.01)

(52) U.S. Cl.
CPC ............ *B60N 2/5635* (2013.01); *B60N 2/5657* (2013.01); *B60N 2/68* (2013.01)

(58) Field of Classification Search
USPC ......................................... 297/180.14, 180.13
See application file for complete search history.

(56) References Cited

U.S. PATENT DOCUMENTS 5,692,952 A *  12/1997  Chih-Hung ................... 454/120
6,048,024 A *   4/2000  Wallman .................. 297/180.14
6,062,641 A *   5/2000  Suzuki et al. ............... 297/180.1
6,929,322 B2 *  8/2005  Aoki et al. ................ 297/180.14
7,261,372 B2 *  8/2007  Aoki ......................... 297/180.14
7,322,643 B2 *  1/2008  Ishima et al. ............... 297/180.1
7,607,739 B2 * 10/2009  Browne et al. ............ 297/452.42
7,673,935 B2 *  3/2010  Nishide et al. ............ 297/180.14
7,963,595 B2 *  6/2011  Ito et al. .................... 297/180.14
2006/0138812 A1 *  6/2006  Aoki ......................... 297/180.14
2008/0143152 A1 *  6/2008  Wolas ....................... 297/180.14
2008/0191521 A1 *  8/2008  Bajic et al. ................ 297/180.12
2009/0008970 A1 *  1/2009  Flory et al. ................ 297/180.14
2009/0295200 A1 * 12/2009  Ito et al. .................... 297/180.14
2011/0133525 A1 *  6/2011  Oota ......................... 297/180.14
2012/0256451 A1 * 10/2012  Sahashi ..................... 297/180.14
2013/0300159 A1 * 11/2013  Berroth .................... 297/180.14

FOREIGN PATENT DOCUMENTS

DE      19847384 C1     10/1998
DE      19920062 A1      5/1999
DE      19927232 A1     12/1999
DE      10207490 C1      2/2002
DE      10255638 A1      6/2003
DE    102006004465 A1    8/2007
DE    102010005728 A1    8/2010
EP       1008486 A2     10/1999
WO     2005037601 A2     4/2005

* cited by examiner

*Primary Examiner* — David E. Allred
(74) *Attorney, Agent, or Firm* — Karl F. Milde, Jr.; Eckert Seamans Cherin & Mellott LLC

(57) ABSTRACT

A seat frame for a vehicle seat comprises an upholstered seat cushion, a seat frame, an upholstery support structure attached thereto and a fan housing with a radial fan. The fan housing has an axial inlet and a radial outlet for the passage of air. The fan housing is supported in the seat frame by means of a holder which includes at least one frame-shaped receptacle adapted to receive the radial outlet of the fan housing and at least one locking element for connecting itself to the fan housing.

13 Claims, 8 Drawing Sheets

SEAT FRAME FOR A VEHICLE SEAT

BACKGROUND OP THE INVENTION

The invention relates to a seat, frame for a vehicle seat having an upholstered seat cushion, a seat frame structure, an upholstery support structure attached thereto and having a radial fan with a fan housing, the fan housing having an axial inlet and a radial outlet opening for passage of air. The fan housing is supported on the seat frame by means of a dimensionally rigid holder.

In addition to heating devices, vehicle seats are increasingly equipped with ventilation devices. In the past, such ventilation devices that, serve the climate control of a seat were reserved for luxury vehicles for cost reasons. However, as the demand for comfort in economy-class vehicles and compact cars increased, climate-controlled seats have been offered as optional features in these vehicles as well.

Such climate control devices include one or more fans that are in flow connection with the ventilation channels in the upholstery of the seat, and/or with the air distribution layer located underneath the upholstery fabric. With these devices, both the seat areas and the backrests and even the headrests can be climate-controlled.

A main component of the climate control device is a fan that produces the required air flow.

One of the considerations when using such fans is to ensure that they supply and extract air to and from certain areas of the seating and rest areas according to the design requirements, that they be arranged in areas of the seat where appropriate space is available, and that they allow for a quick and simple installation and removal.

Known from DE 10 2006 004 465 A1 is an insert for a climate-controlled vehicle seat comprising a three-dimensional air distribution layer that is covered on its upper side with an air-permeable top layer. The top layer at the bottom side of the air distribution layer includes an air inlet but is otherwise airtight. Connected to the air islet is a ring-shaped component in which a fan is suspended. The ring-shaped component exhibits a de-coupling configuration to prevent the transmission of vibrations generated by the fan to the seat.

WO 2005/037601 A2 describes a vehicle seat that has a fan unit (fan blade housing) attached to its carrying structure, namely to the bottom side of the seat, using a mounting arrangement. The air emitted by the fan unit is provided to the seat area via an air guide unit. The air guide unit comprises a rectangular zones that is assigned to the seat area and a channel-shaped zone that forms a connection between the fan and the seat area zone.

DE 102 55 638 A1 describes a climate control unit for a vehicle seat with a fan unit that, is attached to the seat springs of the seat using a plate with a U-shaped cross-section. For this purpose, several seat springs are clamped between the base area of the housing of the fan unit and the U-shaped plate. The fan housing has a pipe socket permanently molded to it that is connected to an air guide channel in the cushion element and thus blows the air into the channels of the cushion element.

DE 199 27 232 A1 concerns a climate control device for a vehicle seat with a central fan unit located underneath the seat frame. The housing of this fan unit is connected to two solid pipes, where one pipe glides air to a channel in the seat cushion of the seat area and the other pipe to a channel in the cushion of the backrest. With this embodiment, the housing of the fan unit is also adapted to the special requirements of the climate-controlled seat.

DE 198 47 384 C1, DE 199 20 062 A1 and DE 102 07 490 C1 describe vehicle seats, where the fan is inserted into an air channel cushion of the seat or in the cavity of a backrest.

EP 1 008 486 B1 discloses to a backrest, for vehicle seats, where a mechanical lumbar support for adapting to the spinal curvature of the user of the seat is attached to the frame of the backrest. The fan for the active ventilation of the backrest cushion is centrally attached to the lumbar support in the cushion area and moves together with the lumbar support, during its adjustment.

DE 10 2010 005 728 A1 describes a seat configuration for a component of a backrest or a seat cushion of a vehicle seat. The seat configuration can be supplemented with a fan in modular fashion. The fan module is mounted in a corresponding opening of a frame element of the seat. A separate holder may be used as an alternative.

SUMMARY OF THE INVENTION

It is the principal object of the present invention to provide a seat frame for a vehicle seat with a radial fan for the ventilation of the seat that is characterised by a simple and largely universally useable configuration that minimizes the manufacturing costs by reducing the variety of parts and materials to be used.

A further object of the present invention is to facilitate the use of slightly balanced or unbalanced commercially available fans in such a manner that vehicle occupants do not experience significant vibrations that can be caused by commercially available fans.

These objectives are achieved by a seat frame for a vehicle seat of the type described hereinabove wherein the housing of the radial fan has axial inlet and radial outlet openings and is supported in the seat frame by means of a dimensionally rigid holder. According to the invention of this holder has at least one frame-shaped receptacle into which the radial housing opening of the fan is inserted, and at least one locking element that is connectable with the fan housing.

A significant advantage of this invention is that the radial fan with the fan housing which can be commercially mass-produced, can be inserted into the frame-shaped receptacle of the holder without structural changes to its radial, housing opening. As mentioned above, the holder also includes at least one locking element that connects to the housing of the radial fan. The unit, consisting of a radial fan and a fan housing, is thus supported only by the frame-shaped receptacle and by the one or more locking elements. No other means of attachment are required. Advantageously, the frame-shaped receptacle is used as an attachment component in order to connect a corresponding air guide channel thereto, which either supplies the air emitted by the radial fan to the seat area or to the backrest area or extracts the air drawn in by the radial fan from the seat area or backrest.

Such a unit, consisting of a holder and a pre-assembled fan unit comprising the radial fan and the fan housing, can be easily installed at various places at the seat frame.

In one preferred embodiment, the holder has a so-called called "base portion". The portion of the fan housing that is located opposite to the axial housing inlet opening is placed flat against this base portion of the holder. It is thus associated with this base portion as the reference area.

In addition to the one or more locking elements, at least, one positioning element can be located on the holder and interact with a corresponding positioning element in the fan housing of the radial fan in a manner that secures the fan housing in position on the holder.

Preferably, the one or more positioning elements located on the holder is/are formed in the manner of a pin that engages in a corresponding recess or opening in the housing of the radial fan.

The frame-shaped receptacle for the radial opening of the fan housing is preferably formed as an attachment component for an air guide channel, as mentioned above. Here, a flexible nose can be attached to the outside of the attachment component as an air guide channel that supplies the air from the radial fan to the seat area. By using such a flexible hose, the unit consisting of holder and, inserted in it, the radial fan with the fan housing can foe attached at areas of the seat frame that are available as free spaces in the seat frame and are not needed for other essential features of the seat.

In another embodiment, a dimensionally stable or rigid channel can be connected to the attachment component of the holder as the air guide channel that redirects the air flow to or from the radial fan, preferably by about 90°. At its other end, the channel is provided with an end channel that widens the channel cross-section and is associated with a seat cushion. The end channel supplies the air in an appropriately adjusted manner from the radial fan across a larger region of the seat area or removes air from this region.

It is also possible to provide an end channel at the attachment component which serves as the air guide channel that widens the attachment component and distributes the air flow to or from the radial, fan at several openings in the upholstery support structure or the seat frame. These openings can be associated with different areas of the seat in order to ventilate these areas or to extract air from them.

Advantageously, the end channel is bowl-shaped and forms a channel together with the frame structure or the upholstery support structure on which it rests.

In a further advantageous embodiment of the invention, a carrier plate is molded to the holder that receives the radial fan housing and can be used as the receptacle for one or more sensor elements of the seat. For example, a seat occupancy sensor can be placed on this carrier plate. The carrier plate can also be used to receive electrical connection and attachment components or electronic components for the seat.

At least one connection element is preferably provided to connect the holder to the upholstery support structure.

Such connection elements may be provided also to connect the holder to the structure of the seat frame.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
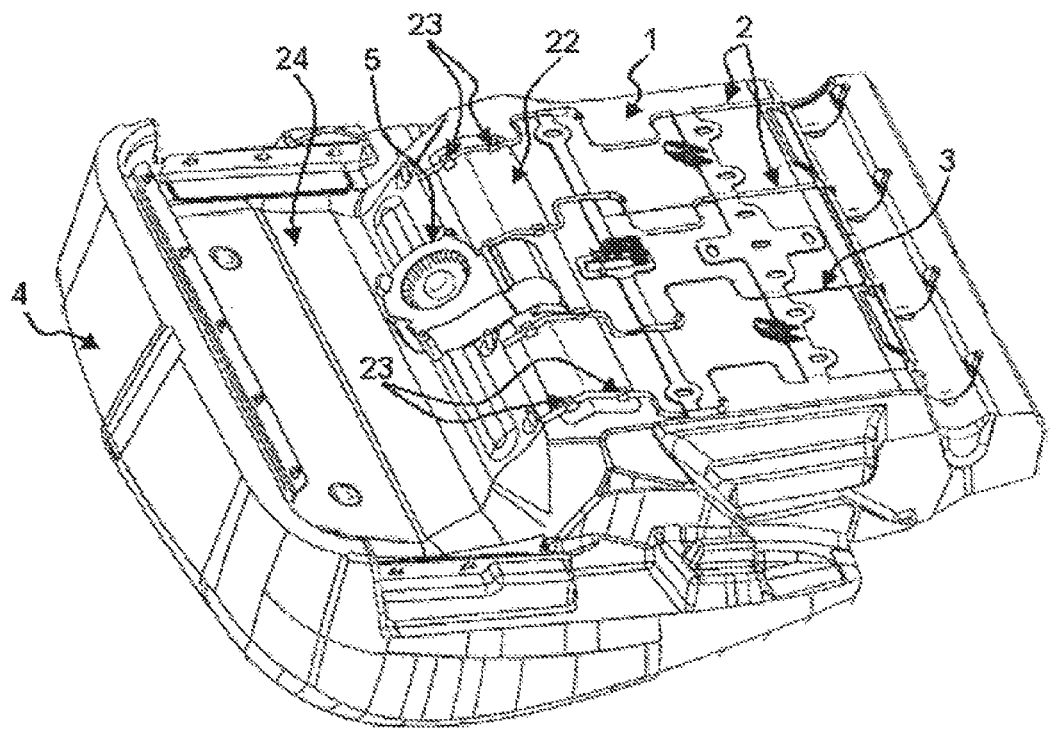
FIG. 1 is a perspective view showing the underside of a seat area of a vehicle seat with a frame configuration and a fan arrangement.

The preferred embodiments of the present invention will, now be described with reference to FIGS. 1-9C of the drawings. Identical elements in the various figures are designated with the same reference numerals.

The seat area of a vehicle seat, which is shown in FIG. 1 in a view of the bottom side, comprises a seat frame in which the upholstery support structure 3, that is formed essentially of bent wires 2, is suspended. A seat cushion mold 4 that forms the seat area is supported by the seat frame 1 and the seat cushion, support structure 3.

Figure 2:
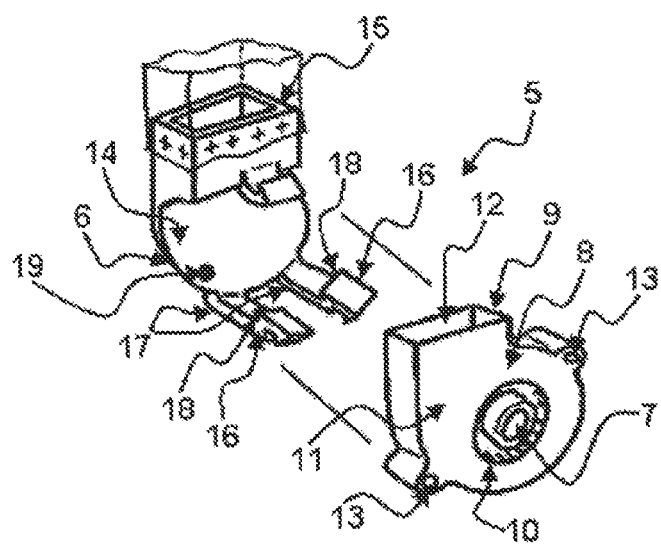
FIG. 2 is a perspective view showing the fan arrangement of FIG. 1 with the associated holder.

As shown schematically in FIG. 2, a fan arrangement 5 is attached to the seat area arrangement of FIG. 1. This fan arrangement 5 includes a holder 6 and a radial fan 7, which is installed in a fan housing 8. The radial fan 7 with the fan housing 8 is a common, ordinary radial fan, which has a radial housing opening 9, as well as an axial housing opening 10 on the upper side of the housing 11 which extends perpendicular to the axis of rotation of the radial fan 7. In contrast, the opposite lower side of the housing 12 is closed.

The fan housing 8 has two mounting holes 13, which typically serve the purpose of screwing such commercially available radial fans to a base. These mounting holes 13 extend perpendicular to the two housing sides 11 and 12.

The holder 6, as shown in FIG. 2 is separated from the fan housing 8 of the radial fan 7, comprises a base portion 14, a frame-shaped receptacle 15 on its one side and two locking elements 16 on the side opposite the frame-shaped receptacle 15. The area secured by the frame-shaped receptacle 15 runs perpendicular to the base portion 14 and is thus oriented such that the radial housing opening 9 of the fan housing 8 is inserted into the frame-shaped receptacle 15 when the fan housing rests on the base portion 14 of the holder 6 with the bottom side of its housing (the side opposite the axial inlet opening).

Length and positioning of the locking elements 16, which may be spring-loaded arms 17 with locking protrusions 18, are designed such that the locking protrusions 18 rest on the upper housing side 11 of the fan housing 8 when the fan housing 8 rests on the base area 14. In this manner, the radial fan 7 is held together with the fan housing 8 without additional fasteners that would need to be secured by means of tools, even though a commercially available radial fan with fan housing is used for this fan arrangement.

In addition, a positioning element in the shape of a pin-like protrusion or peg 19 is located at the base portion 14 of the holder 6, and with its position on the base portion 14 is assigned to the one fastening hole 13 of the fan housing 8. By the fact that this pin-like protrusion 19 is inserted into the fastening hole 13 of the fan housing 8, the fan housing is additionally secured against moving on the base portion 14.

Figure 3A:
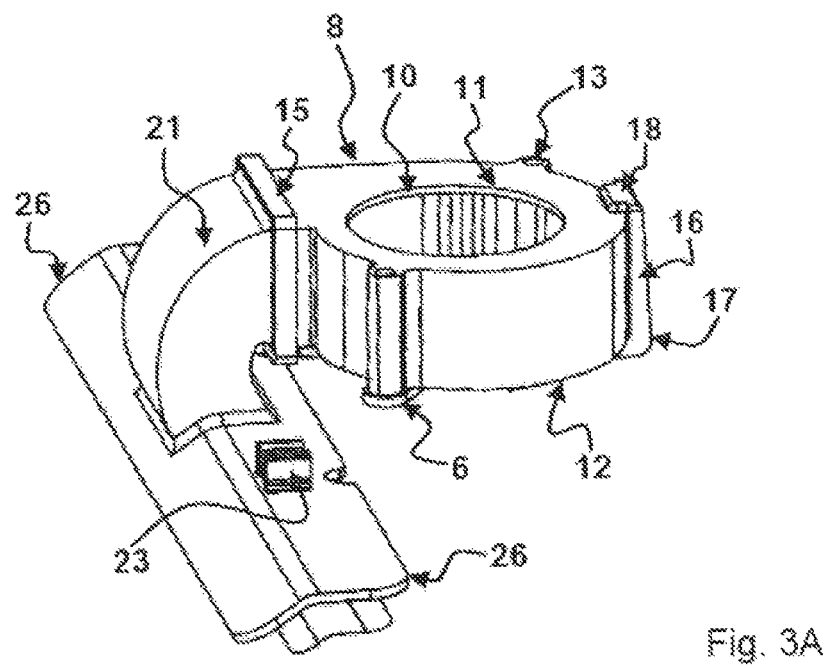
FIG. 3A is a perspective top view of a further embodiment of the fan arrangement with the holder of FIG. 2.
Figure 3B:
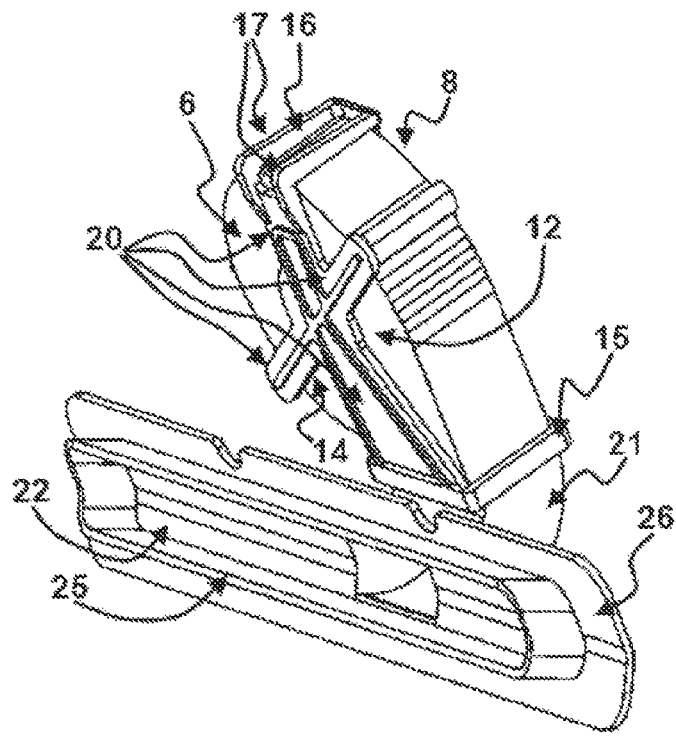
FIG. 3B is a perspective bottom view of the arrangement of FIG. 3A.

FIGS. 3A and 3B show a detailed view of a holder 6 with a fan housing 8 inserted therein. In contrast to the FIG. 2, the holder 6 includes only a single locking element 16. Furthermore, the base portion 14 is composed of rod-shaped area parts 20, which together span an area on which the bottom housing side 12 of the fan housing 8 rests. The area parts 20 are positioned such that two ends, each having a pin-shaped protrusion (not shown), are assigned to the fastening holes 13 of the fan housing 8, while another area element 20 carries a locking element 16 at its end, as described in connection with FIG. 2.

FIGS. 3A and 3B also show that a dimensionally stable channel 21 follows the frame-shaped receptacle 15 of the holder 6 and transitions at its end into an end channel 22 that widens the cross-section of channel 21.

While in FIGS. 3A and 3B the channel 21 is designed such that it redirects the air flow from or to the fan housing 8 by about 90°, other angles can be provided as well. The respective angle depends on the type of seat cushion structure, in particular from that point where the air flow is supplied to the seat cushion or is extracted from the seat cushion.

FIG. 1 shows the fan arrangement, as presented in FIGS. 3A and 3B, installed in the seat. To mount the fan arrangement, connection elements 23 are arranged at the fan housing 8, and/or at the channel 21 and/or at the end channel 22, with FIG. 3A showing only one of the connection elements, which is clamped onto the wires 2 of the cushion carrying structure 3. In the arrangement of FIG. 1, a total of eight connection elements 23 are used that are clamped to four wires 2 of the cushion carrying structure 3. The fan housing 8 with the holder 6 and the channel 22 hangs freely from the area component 20 and extends into a free space 24 in the front area of the seat's frame configuration 1.

As can be seen additionally in FIG. 1, the end channel 22 runs with its longest dimension in the direction of the width of the seat area. The end channel 22 is limited by a surrounding strip 25, which inserts into a corresponding—not shown in detail—recess in the seat's cushion mold 4. The edge area of the recess is covered by a covering part 26 which rests against the bottom side of the seat cushion mold 4.

While FIGS. 1 to 3 show a holder 6 with a dimensionally stable channel attached to the frame-shaped receptacle 15, FIGS. 4, 5 and 6A to 6C show an embodiment, in which the frame-shaped receptacle, also designated with the reference 15, is connected to a flexible hose 27 in order to supply the air from the radial fan, of which only the fan housing 8 is shown, to defined areas of the seat area or the backrest, as in the example shown, or is extracted from there.

Where components are presented in the individual embodiments that correspond in their function and/or effect to those of another embodiment, the same reference characters are used without these components being described anew based on each exemplary embodiment. Therefore, the explanations for one embodiment are transferable analogously to the respective other embodiments.

Figure 4:
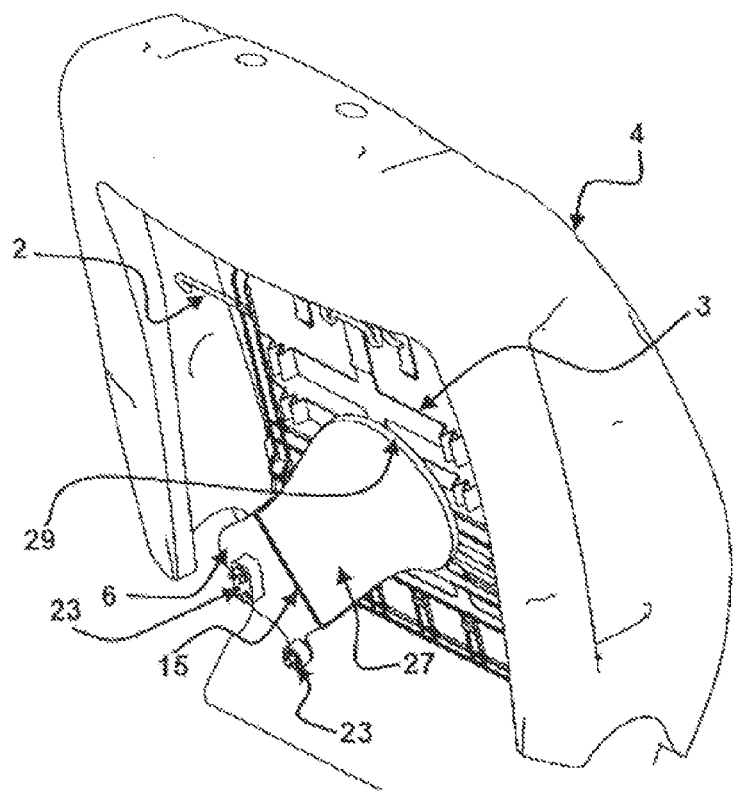
FIG. 4 is a perspective view of the rear of a backrest with a further embodiment of a fan arrangement.
Figure 5:
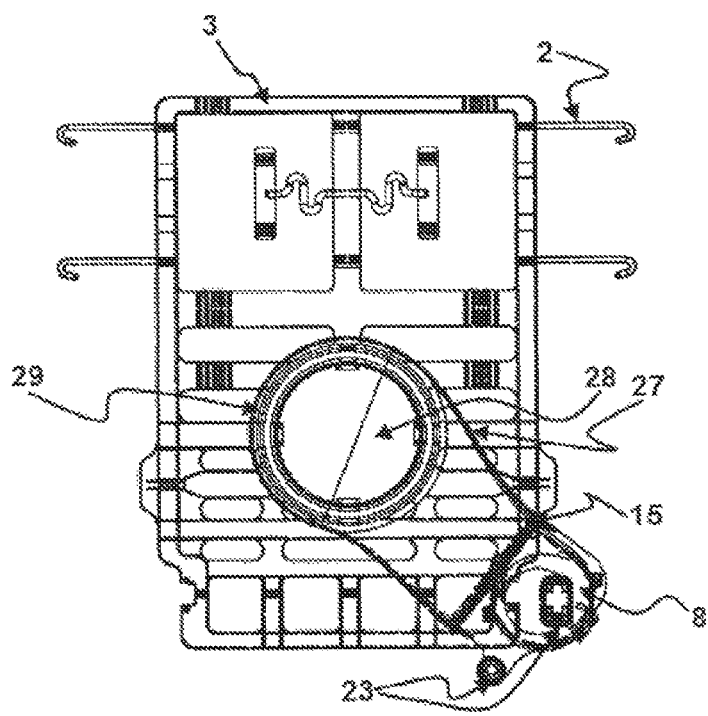
FIG. 5 is a top view of a cushion carrying structure as installed in the backrest of FIG. 4.

For the flexible hose 27, a larger frame-shaped receptacle 15 is formed at the holder 6 as shown, in FIGS. 4 to 6 in order to fasten the flexible hose 27 thereon. Using adhesive strips or dots, clips, arresters, plug-type connectors or weld joints—all not visible in the Figures—the hose 27 can be attached to the frame-shaped retainer at the holder 6. According to the presentation in FIGS. 2 and 3, the frame 15 also has a cross-sectional opening such that the radial housing opening 9 of the fan housing 8 can be inserted; other than that, the frame 15 is closed. The hose 27, preferably a foil hose made from the group of plastics such as PE, PTFE, PUR, has at its other end a hose opening 28, which is limited by a stable flange ring 29. This stable flange ring 29 is made of plastic such as polypropylene (PP) or polyamide (PA; PA6; PAS6.6). In a further embodiment, the stable flange ring 29 is additionally provided with a sealing material. It is also possible to manufacture the flange ring 29 from a flexible plastic material, such as TPE or EPDM. In a further embodiment, it is possible to manufacture the stable flange ring 29 from a composite of TPE or EPDM and PP or PA or PA6 or PA6.6. The hose 27 is connected to the flange ring 29 using methods such as gluing, clamping, pressing, welding or arresting. The manner of connection is not apparent from the Figures.

Figure 6A:
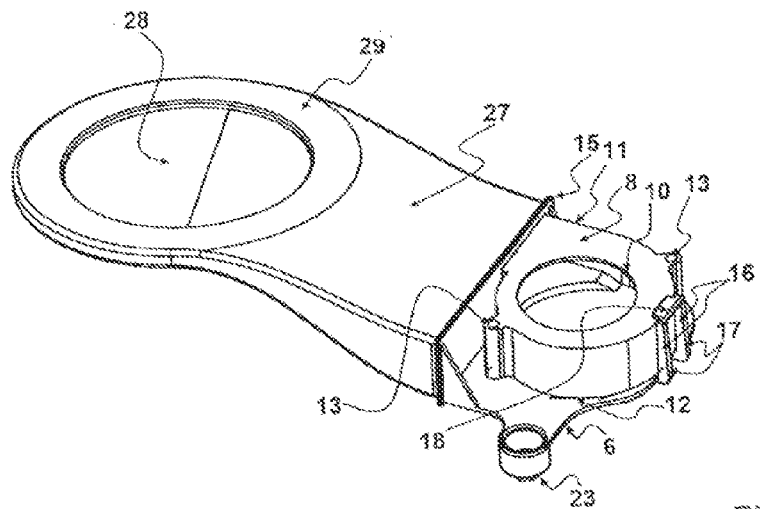
FIGS. 6A to 6B are throes perspective views of the fan arrangement of FIG. 4.
Figure 6B:
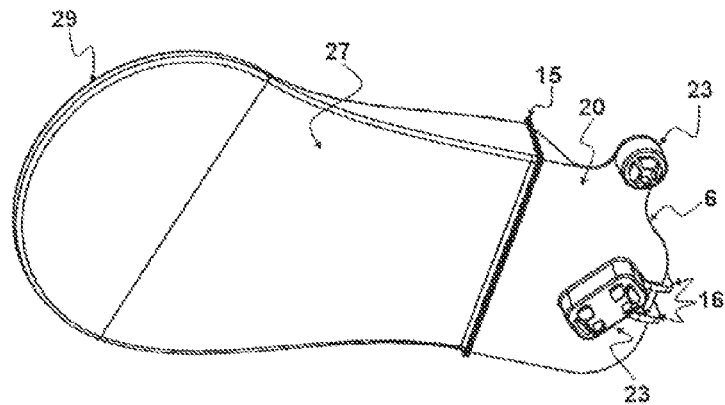
Figure 6C:
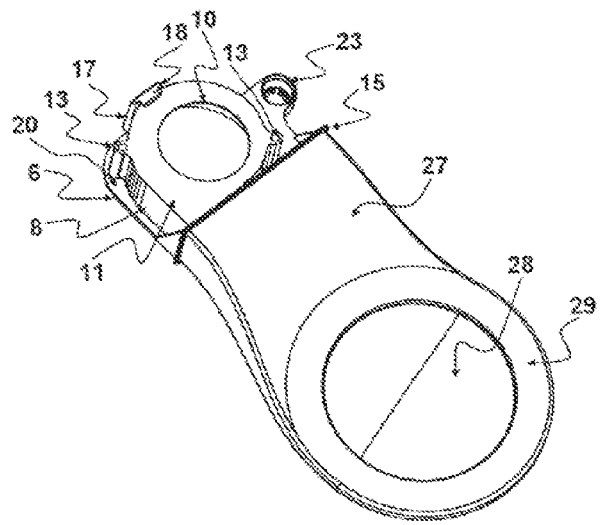

The fan arrangement of as shown in detail in FIGS. 6A to 6C, offers great freedom in its positioning within the seat frame. Due to the flexible hose 27, which can be adapted in its length and shape to the respective requirements of the seat configuration and the constrictive characteristics of the seat configuration, the fan arrangement can be arranged at any desired location of the frame configuration, or the cushion carrying structure by means of the holder, into which a typical radial fan must only be clamped into the fan housing, and the air can be supplied to the desired areas of the seat cushion structure by attaching the hose 27 at that location using the flange rings 29. FIGS. 4 and 5 show as a preferred example a backrest (FIG. 4) with a cushion carrying structure (shown in FIG. 5 separated from the backrest). The holder 6 with, the fan is connected in a corner area to the cushion carrying structure 5 using at least one corresponding connection element 23 like those shown, for example, in FIG. 6B. From this corner area, the air is guided to about the middle of the backrest via hose 27. By positioning the fan housing 8 with the radial fan 7 in this place, the relevant area of the backrest is not affected by the massive structure of the fan arrangement.

Figure 8A:
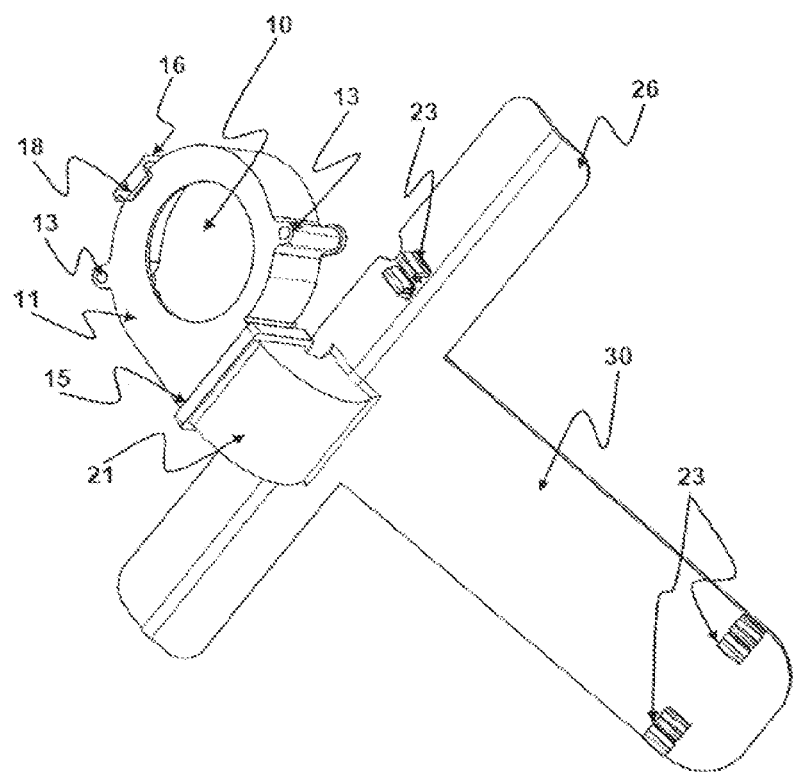
FIGS. 8A and 8B are top and bottom views of a backrest seat frame with a fan arrangement separated from the frame configuration.
Figure 8B:
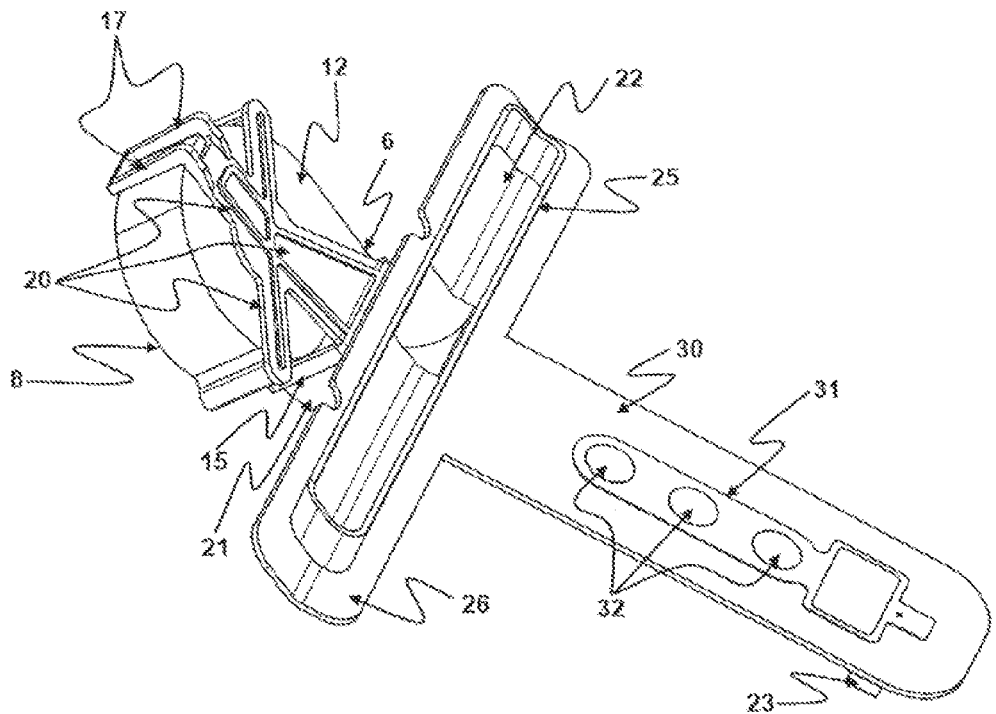

FIGS. 8A and 8B show a fan arrangement that corresponds to those of FIGS. 3A and 3B in their basic configuration. In addition, contrary to the embodiment of FIGS. 3A and 3B, a carrier plate 30 that can be used as a component with a sensory function is molded on the holder 6, or the end channel 22, which is part of the holder 6. In FIG. 8B, the carrier plate 30 with the sensory function component is oriented in the direction of the longitudinal direction of the vehicle seat. It is also conceivable that the carrier plate with the respective sensory function component is oriented in the transverse direction of the vehicle seat. In FIG. 8B, a seat occupation sensor 31 is located on this carrier plate 30 as a preferred example, which comprises three sensory fields 32, for example. If such an arrangement is positioned between the cushion carrying structure and a side of the cushion core that faces away from the occupant, as shown in FIG. 1, this carrier plate 30 extends into the rear seat area, i.e., into the area where the backrest joins. In this manner, the holder 6 is not only used to hold the fan 7 with the fan housing 8, but also serves at the same time as a carrier for a sensory function component, such as seat occupancy sensors 31, for example.

Figure 7:
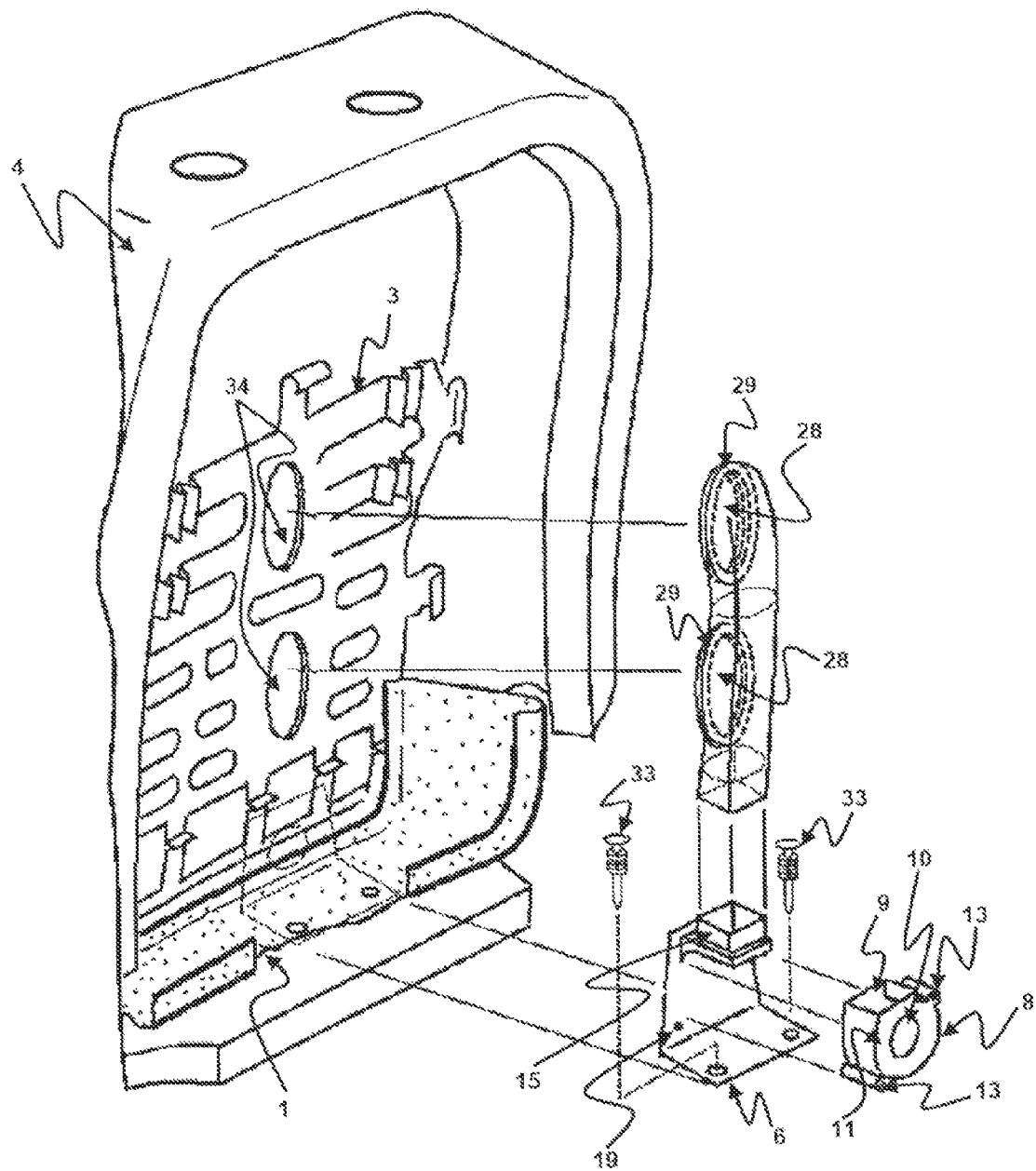
FIG. 7 is a perspective view of a fan arrangement that is similar to embodiments of the fan arrangement shown in FIGS. 3A and 3B with an additional carrier plate.

FIG. 7 shows a further embodiment, that uses a holder 6 with a flexible hose 27 attached to the frame-shaped receptacle 15. Contrary to the embodiments of FIGS. 6A to 6C, the hose 27 has two hose openings 28, each featuring a flange ring 29. The arrangement of the hose openings 28 can be one above the other (vertically) as is shown in FIG. 7. Other arrangements of the hose openings are conceivable as well, such as a horizontal, arrangement or one offset, by an angle. Ultimately, the position or arrangement of the hose openings 28 is dependent on the respective circumstances and the available assembly room of the seat frame. The hose 27 is attached at the respective openings 34 in the cushion carrying structure 3 using the flange rings 20; these openings 34 in the cushion carrying structure 3 in turn are assigned to openings (not shown in detail) in the frame configuration 1 and seat cushion mold 4.

The holder 6, in which the fan housing 8 is held by clamping, is attached to parts of the frame configuration 1 using fasteners 33.

Preferably, the holder 6, hut also the channel 21, as well as the end channel 22, are made of a rigid material, such as plastic, metal, or a composite material. However, it can also be made of a semi-flexible material, e.g., a PUR molding, or of a flexible material such as TFE, EPBM. Particularly preferred are materials from the group of polymers, such as PA; PA6; PAS6.6; PP; PP made with fiberglass content, preferably manufactured as injection-molded parts.

Figure 9A:
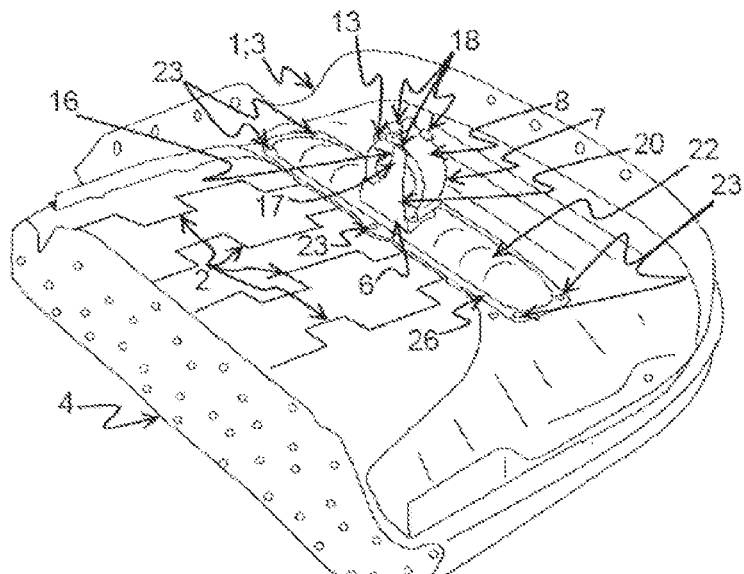
FIGS. 9A to 9C are perspective views of a part of a seat area with a view of its bottom side, partially in exploded view.
Figure 9B:
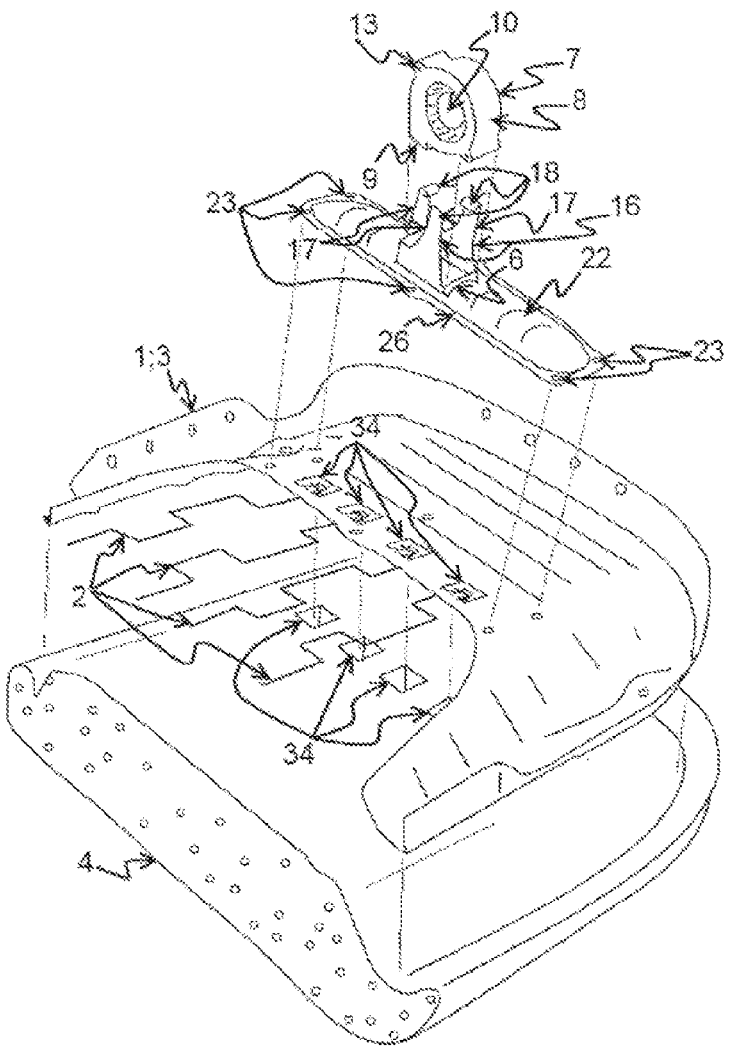
Figure 9C:
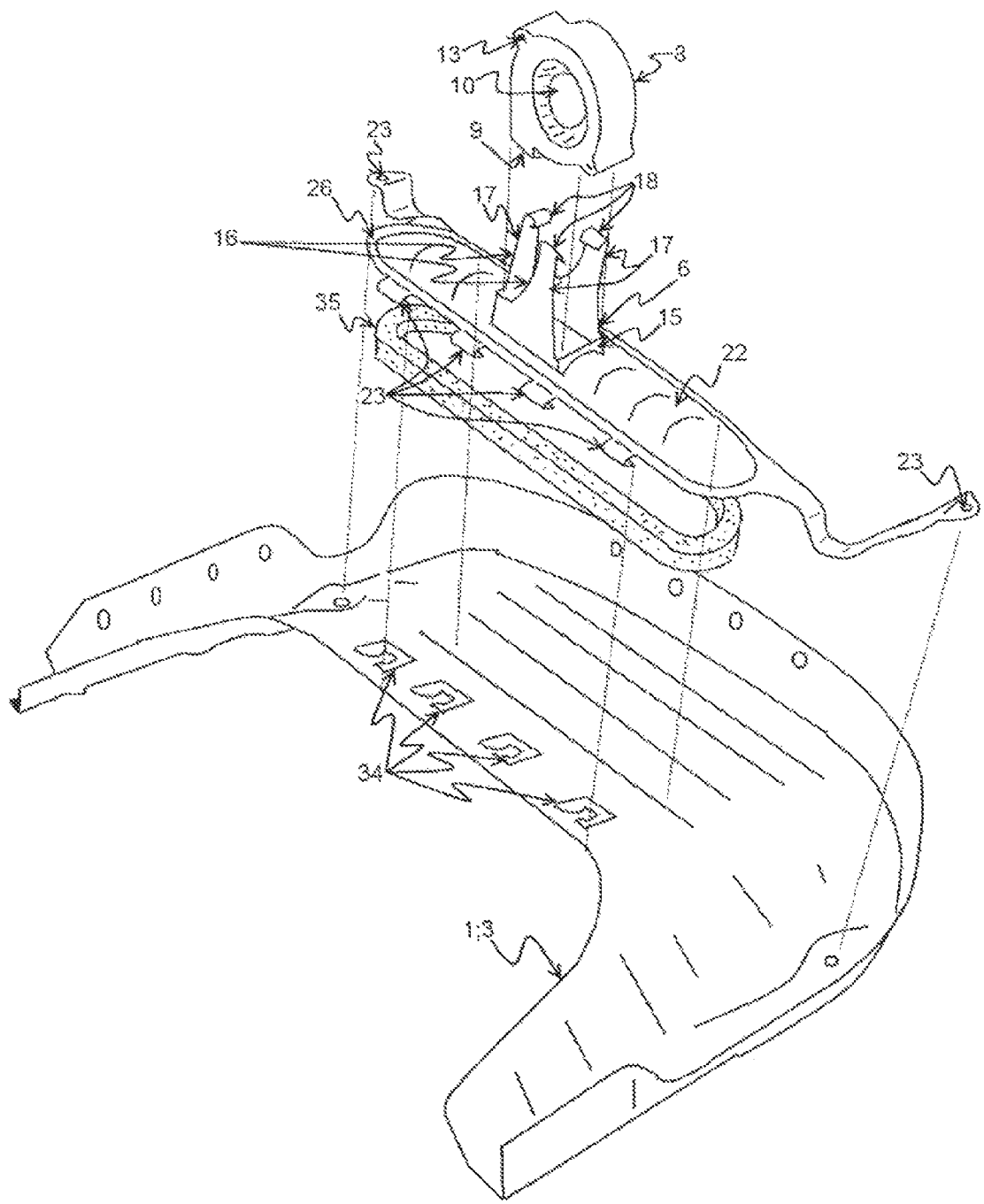

Finally, FIGS. 9A to 9C show a seat area part with view of its underside, which exhibits a further embodiment of the fan arrangement. Again, components that are comparable with components of other embodiments or which correspond to them are designated with the same reference character.

Compared to the previously described embodiments, especially compared to the embodiment of FIGS. 3A and 3B, the holder 6 with its frame-shaped receptacle 15 is arranged directly at the end channel 22. The spring-loaded arms 17 with the locking protrusions 18 at their ends engage in the radial side walls of the fan housing, when the radial housing opening 9 of the fan housing 3 is inserted into the frame-shaped receptacle 15. The two opposing spring-loaded arms 17 of the holder 6 then rest on the upper and lower housing side 11, 12 of the fan housing 8, however, in an area of the fan housing 8 in which the axial housing opening 10 is not obstructed.

The end channel 22 in the embodiment of FIGS. 9A to 9C is designed as an elongated, flat part in the shape of a half-bowl and about semicircular in its cross-section. The length of this end channel 22 is selected such that it covers several openings 34 in the frame structure 1 or the upholstery support structure 3. Corresponding openings 34 exist also in the seat cushion mold 4, as can be recognised in FIG. 9B. The end channel 22 in turn has edge connection elements 23, which are designed as brackets, with which the end channel 22 and thus also the holder 6 attached to it can be clamped to an edge of the frame structure 1 together with the radial fan 7 inserted in said holder.

A ring seal 35 can be provided between the end channel 22 and seat frame 1.

There has thus been shown and described a novel seat frame for a vehicle seat which fulfills all the objects and advantages sought therefor. Many changes, modifications, variations and other vises and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. Ventilation apparatus for a vehicle seat having an upholstered seat cushion, a seat frame, an upholstery support structure attached thereto, and a fan housing with a radial fan formed as a preassembled fan unit, said fan housing having a bottom side and an upper housing side, the upper housing side including an axial inlet and a radial outlet for the passage of air, wherein said fan housing is supported in the seat frame by means of a holder, the improvement wherein the holder is formed as a separate unit from the fan housing and comprises, in combination:
   (a) a base portion on which the bottom side of the fan housing rests;
   (b) at least one frame-shaped receptacle that extends from the base portion of the holder in such a manner that the radial outlet of the fan housing is received into the frame-shaped receptacle, and
   (c) at least one spring-loaded arm extending from the base portion separately from the frame-shaped receptacle and having at least one locking element at its end for connecting the holder to the fan housing.

2. A seat frame as set forth in claim 1, wherein the base portion of the holder is configured to rest against the bottom side of the fan housing opposite to the axial inlet.

3. A seat frame as set forth in claim 1, wherein the holder further comprises at least one positioning element which engages a corresponding positioning element on the fan housing and secures the holder with respect to the fan housing.

4. A seat frame as set forth in claim 3, wherein the at least one positioning element is pin-shaped and the corresponding element on the fan housing is a recess or opening.

5. A seat frame as set forth in claim 1, wherein the frame-shaped receptacle for the radial outlet of the fan housing is configured as an attachment component for an air guide channel.

6. A seat frame as set forth in claim 5, wherein a flexible hose is attached as an air guide channel to the outer end of the attachment component.

7. A seat frame as set forth in claim 5, wherein a rigid channel is connected as an air guide channel to the attachment component, redirecting air flow to or from the radial fan, and wherein the rigid channel feeds into an end channel arranged at a seat cushion that widens the air channel cross-section.

8. A seat frame as set forth in claim 7, wherein the air guide channel redirects the air flow by about 90°.

9. A seat frame as set forth in claim 5, wherein an end channel is configured as an air guide channel for the attachment component that widens the air channel cross-section of the attachment component and is arranged at a seat cushion and that distributes the air flow to or from the radial fan to a plurality of openings in at least one of the upholstery support structure and the frame structure.

10. A seat frame as set forth in claim 9, wherein the end channel is bowl-shaped.

11. A seat frame as set forth in claim 1, wherein the holder includes a carrier plate which is configured as a receptacle for at least one sensor element.

12. A seat frame as set forth in claim 1, wherein the holder includes at least one connection element for connection to the upholstery support structure.

13. A seat frame as set forth in claim 1, wherein the holder includes at least one connection element for connection to the frame structure.

* * * * *